United States Patent [19]
Scott

[11] Patent Number: 5,415,464
[45] Date of Patent: May 16, 1995

[54] CAST VEHICLE WHEELS

[75] Inventor: Roy Scott, Maidstone, United Kingdom

[73] Assignee: Alloy Wheels International Ltd., Rochester, United Kingdom

[21] Appl. No.: 243,461

[22] Filed: May 16, 1994

Related U.S. Application Data

[62] Division of Ser. No. 982,887, Nov. 30, 1992, Pat. No. 5,311,918.

[30] Foreign Application Priority Data

Nov. 29, 1991 [GB] United Kingdom ............... 9125524

[51] Int. Cl.6 .............................................. B60B 21/00
[52] U.S. Cl. .......................................... 301/65; 301/95
[58] Field of Search ....................... 301/65, 95, 96, 97, 301/98, 64.1

[56] References Cited

U.S. PATENT DOCUMENTS

| 4,165,131 | 8/1979 | Thompson | 301/65 |
| 4,861,113 | 8/1989 | Inamura et al. | 301/65 |
| 5,271,663 | 12/1993 | Maldini et al. | 301/95 X |
| 5,292,182 | 3/1994 | Kanazawa et al. | 301/65 |

FOREIGN PATENT DOCUMENTS 8505328 12/1985 WIPO ................................. 301/65

Primary Examiner—Russell D. Stormer
Attorney, Agent, or Firm—Richard M. Goldberg

[57] ABSTRACT

Cast vehicle wheels formed with a re-entrant portion or lightening pocket beneath the tire bead retaining seat, and a casting mold and method of manufacture thereof. The mold is manufactured with movable side portions enabling the formation of the re-entrant portion in the wheel. The re-entrant portion reduces the weight of the wheel without adversely affecting the wheel characteristics.

19 Claims, 3 Drawing Sheets

CAST VEHICLE WHEELS

This is a division, of application Ser. No. 07/982,887, filed Nov. 30, 1992, now U.S. Pat. No. 5,311,918.

This invention relates to cast vehicle wheels and to methods and apparatus for manufacturing them.

BACKGROUND OF THE INVENTION

The unsprung weight of a vehicle, in particular a high performance motor car, is extremely significant in determining the handling and speed characteristics of the vehicle.

It is for this reason, among others, that cast alloy road wheels are fitted, as compared with pressed steel road wheels.

However, the final, detailed design of a cast alloy wheel is a compromise between, on the one hand, the optimum strength/weight ratio needed from a merely engineering/operational point of view and, on the other hand, the shape/volume of metal and mold construction required for the efficient casting of the metal during production.

The present invention is concerned with reducing the weight of a cast metal wheel, while at the same time keeping the manufacturing process and apparatus relatively simple.

International Patent Application WO81/03465 discloses a cast vehicle wheel which is of imperforate annular disc form and which has a bead seating wall spaced radially outward from a surface of the rim member in order to define a space between the rim and the bead seating wall.

SUMMARY OF THE INVENTION

According to a first aspect of the present invention a cast wheel has a re-entrant portion in the underside of the tire bead retaining seat of the wheel, so as to reduce the wheel weight, the re-entrant portion running in a substantially continuous annulus along the length of the bead retaining seat.

Preferably the re-entrant portion includes a plurality of struts which both strengthen the wheel and facilitate tire fitment.

According to the second aspect of the present invention there is provided a casting mold for use in casting an alloy wheel as described above.

The side portions of the said mold, which form the surface of the wheel including the tire bead retaining seats, are movable with respect to the remainder of the mold so as to enable the removal of an undercutting member from the re-entrant portion without damage to the tire bead retaining seat, when in use.

Preferably the side portions are hinged so that the undercutting portion moves in an arc with respect to the hinge.

According to a further aspect of the present invention there is provided a method of manufacturing an alloy wheel having a re-entrant portion or lightening pocket undercutting the tire bead retaining wheel as described above.

Preferably the casting mold, having side portions, capable of forming a re-entrant portion or lightening pocket in the tire bead retaining seat, is filled with molten metal and allowed to set in the normal manner, whereupon the side portions are hingeably removed so as to form the said re-entrant portion.

An embodiment of the present invention will now be described, by way of example, with reference to the accompanying drawings in which:

DETAILED DESCRIPTION OF PREFERRED EMBODIMENTS

Figure 1:
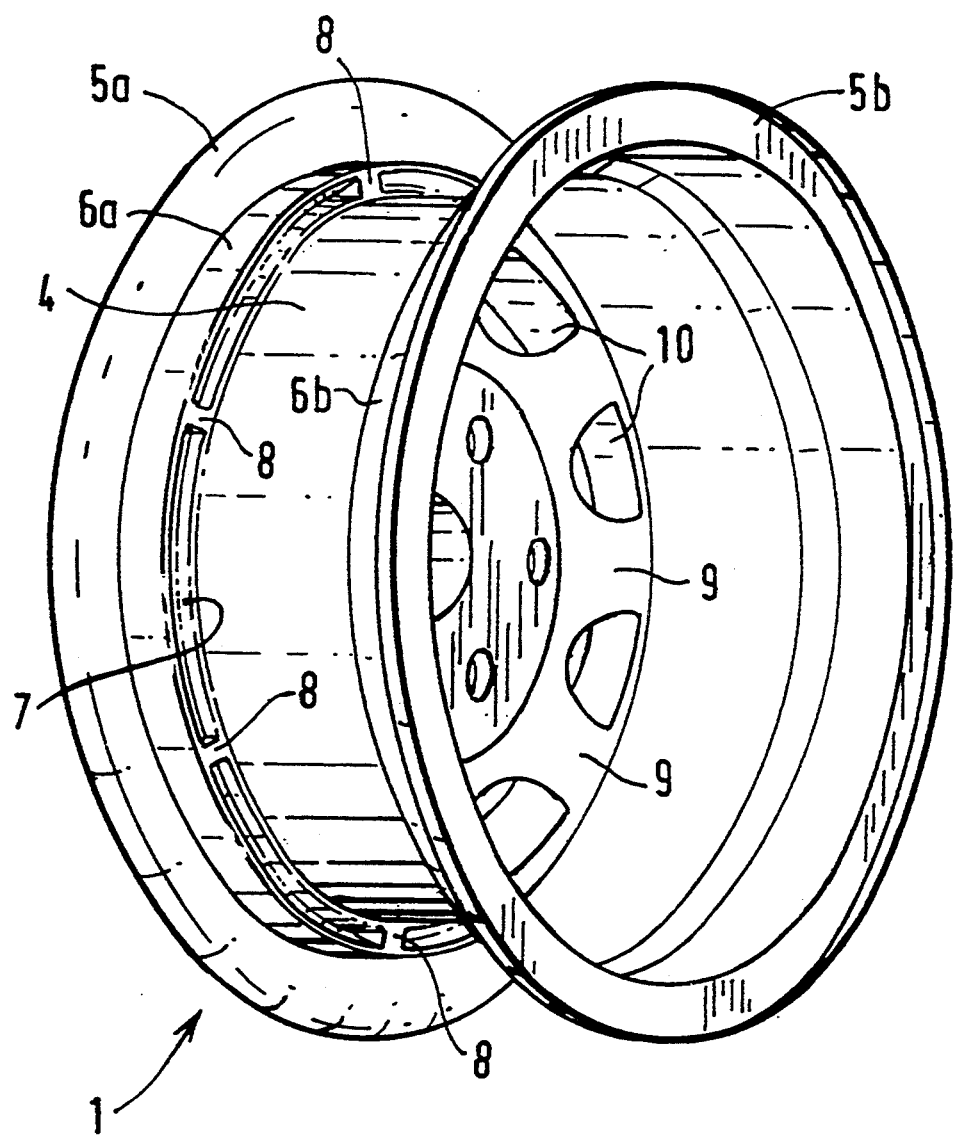
FIG. 1 is a perspective view of an alloy wheel according to the first aspect of the present invention.

A one-piece cast alloy vehicle wheel 1 includes a hub member 2, a disc section 3 surrounding and formed integrally with the hub member 2, a generally cylindrical rim member 4 formed integrally with the disc section 3 and located radially outwardly of the hub member 2, a tire retaining wall 5a,5b at each end of the cylindrical rim member 4, and a substantially cylindrical tire bead seating surface 6a,6b formed integrally with each one of the tire retaining walls 5a,5b.

An annular recess 7 is formed radially inwardly of the bead seating surface 6a and substantially beneath it, in order to reduce the weight of the cast wheel, thereby forming a lightening pocket or a re-entrant portion.

The annular recess 7 has a number of struts 8 formed therein. The purpose of the struts 8 is to assist in tire fitment, as well as acting as a reinforcement.

The portion of the wheel between the disc section 3 and the rim member 4 is shaped to form a plurality of spoke sections 9, each pair of spoke sections 9 being separated by a perforation 10, there being eight spoke sections 9 and perforations 10.

All the elements or members 1 to 9 are cast integrally with one another to form a one-piece wheel.

The material of the wheel is a metal alloy, preferably of aluminium or magnesium. A mold for manufacturing the cast wheel shown in FIG. 1 will now be described with reference to FIGS. 2 and 3.

A casting mold consists of tire rim profile blocks A1, A2, A3, A4, a styling face block B and an inside profile block C.

In the assembled condition of the mold the single-piece styling face block B and the single-piece inside profile block C are located together by a plurality of dowels 11 to ensure concentricity. The styling face block B is mounted on a support plate (not shown) and the whole assembly is then fitted onto the casting machine.

Each of the four tire rim profile blocks A1, A2, A3 and A4 is in the form of a 90° segment so that together they define the outer profile of the rim of the wheel to be cast.

Figure 2:
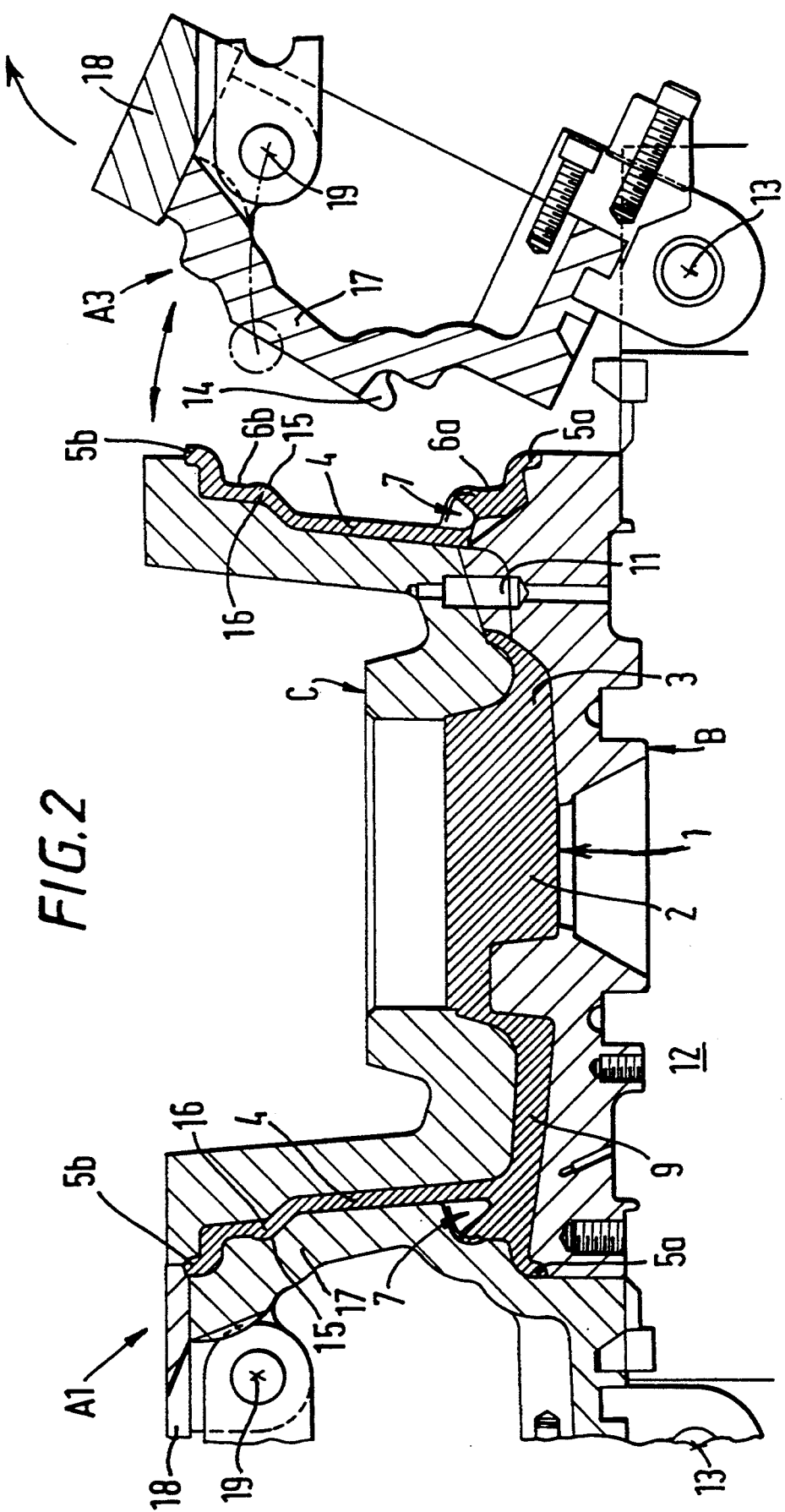
FIG. 2 is a sectional side view of a casting mold in accordance with the second aspect of the present invention.
Figure 3:
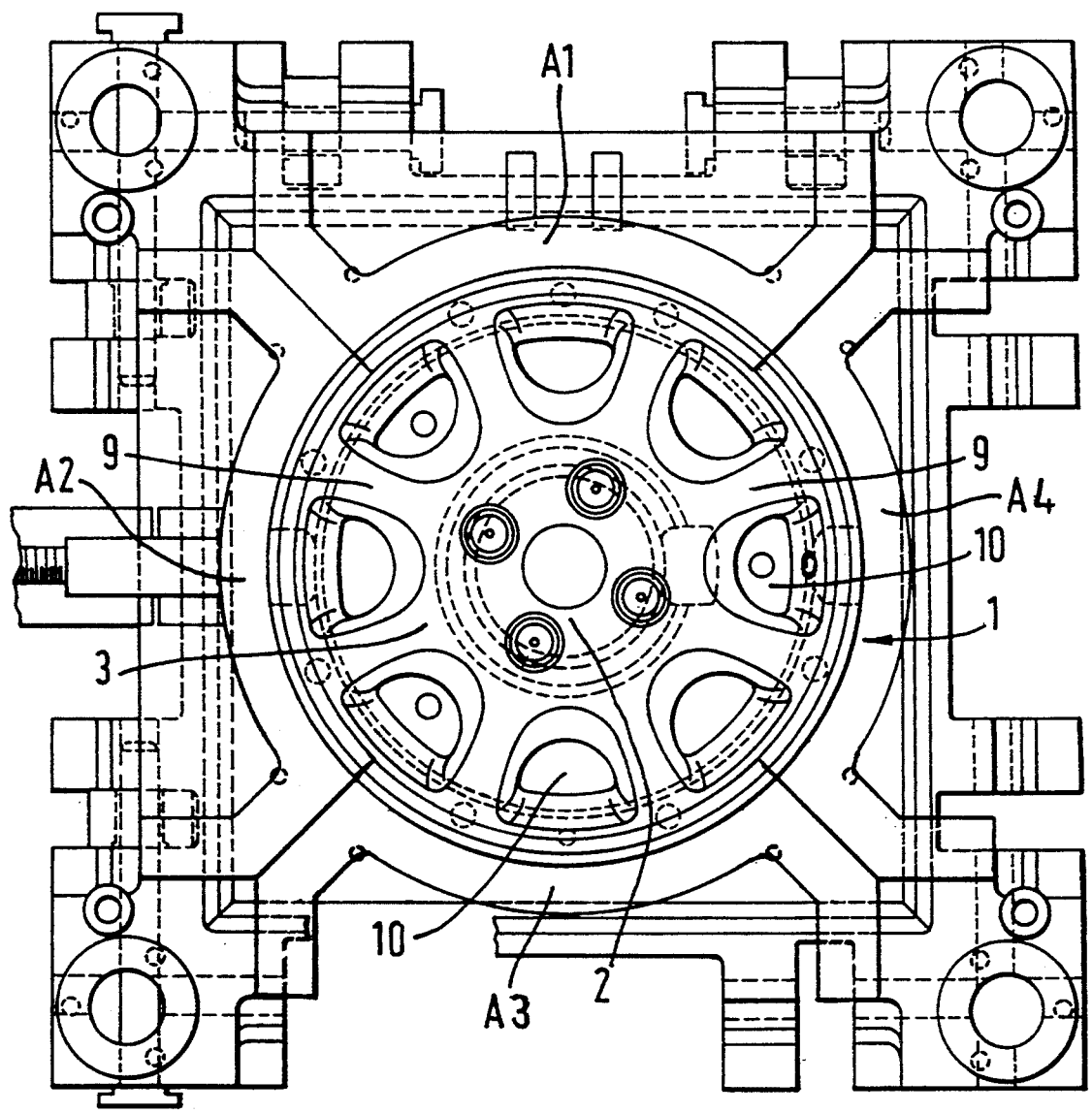
FIG. 3 is a plan view of the casting mold of FIG. 2.

Each tire rim profile block A1, A2, A3 and A4 is hinged at 13 to the support structure 12 so that it can be pivoted between a closed position, shown on the left in FIG. 2, and an open position, shown on the right in FIG. 2. In their closed positions the blocks A1, A2, A3 and A4 define the tire rim profile and in their open positions enable the cast wheel to be removed from the mold. The annular recess 7 is formed by an arcuate projection 14 which itself is formed as part of each of the four tire rim profile blocks A1, A2, A3, A4 so that together the four arcuate projections (90° each) form a continuous annular projection when the mold blocks are in their closed positions.

Each block A1, A2, A3, A4 has an arcuate recess 15 so that together in their closed position the recesses 15 define a tire bead retaining rim 16 which is located axially inwardly of the cylindrical tire bead seating surface 6a in relation to the front styling face of the wheel.

When in use, the casting mold, including the side portions 17, are located together so as to form the mold area for the required wheel and molten metal to be poured, pumped or injected into the mold and allowed to set in the normal manner. The top portions 18 of the mold are then hinged about hinges 19 in the direction of the arrow in FIG. 2. Thereafter the side portions 17 are hingeably moved so as to remove the undercutting member 14 from the newly formed wheel 1 without damaging the tire bead retaining seat 3. The remainder of the casting mold may also be removed without damaging the remainder of the wheel in the normal manner.

The style and dimensions of the wheel may vary depending on commercial requirements and the method and apparatus are not limited to any particular style or dimension.

The mold when closed may be filled using any appropriate known process such as those known as 'low-pressure', 'counter pressure', 'gravity fill', 'centrifugal', 'semi-solid' or 'squeeze casting'. The sequence of operations can vary, but the rim profile blocks A1–A4 always create the annular recess 7 by undercutting the seating surface 6a.

When the mold is in the closed position an alloy of magnesium or aluminium can be injected into the mold either under pressure or the mold may be evacuated by a vacuum pump (not shown) and the alloy drawn into the mold under suction or counterpressure. The mold may also be filled merely by pouring the alloy into the mold under gravity.

After the alloy has solidified, the mold is opened. The cast wheel is then removed in the normal manner. The mold is closed again and the cycle repeated.

By employing the present invention a weight saving of around 0.5 kg per wheel can be achieved.

What is claimed is:

1. A one-piece cast vehicle wheel comprising:
  a hub member,
  an annular disc section surrounding and formed integrally with the hub member,
  a generally cylindrical rim member formed integrally with the disc section and located radially outwardly of the hub member,
  a tire-retaining wall at each end of the cylindrical rim member and a substantially cylindrical tire bead seating surface formed integrally with each one of the tire-retaining walls, and
  a substantially continuous annular recess formed radially inwardly of at least one of the bead seating surfaces and located substantially beneath the said bead seating surface in order to reduce the weight of the cast wheel.

2. A cast wheel as claimed in claim 1 in which there is at least one strut member located within said annular recess and formed integrally with the cast material defining the said annular recess.

3. A cast wheel as claimed in claim 1 in which the disc section is perforated to define spoke-like members.

4. A cast wheel as claimed in claim 2 in which the disc section is perforated to define spoke-like members.

5. A cast wheel as claimed in claim 1 in which the material of the wheel is a metal alloy.

6. A cast wheel as claimed in claim 2 in which the material of the wheel is a metal alloy.

7. A cast wheel as claimed in claim 3 in which the material of the wheel is a metal alloy.

8. A cast wheel as claimed in claim 4 in which the material of the wheel is a metal alloy.

9. A cast wheel as claimed in claim 5 in which the metal alloy is an aluminium alloy.

10. A cast wheel as claimed in claim 6 in which the metal alloy is an aluminium alloy.

11. A cast wheel as claimed in claim 7 in which the metal alloy is an aluminium alloy.

12. A cast wheel as claimed in claim 8 in which the metal alloy is an aluminium alloy.

13. A cast wheel as claimed in claim 5 in which the metal alloy is a magnesium alloy.

14. A cast wheel as claimed in claim 6 in which the metal alloy is a magnesium alloy.

15. A cast wheel as claimed in claim 7 in which the metal alloy is a magnesium alloy.

16. A cast wheel as claimed in claim 8 in which the metal alloy is a magnesium alloy.

17. A cast wheel as claimed in claim 2 in which there are a plurality of said strut members, and the circumferential length of portions of said substantially continuous recess between adjacent strut members is substantially greater than the circumferential length of each said strut member.

18. A cast wheel as claimed in claim 17 in which each said strut member has a substantially constant circumferential length.

19. A cast wheel as claimed in claim 2 in which each said strut member has a substantially constant circumferential length.

* * * * *

UNITED STATES PATENT AND TRADEMARK OFFICE
CERTIFICATE OF CORRECTION

PATENT NO. : 5,415,464

DATED : May 16, 1995

INVENTOR(S) : Roy Scott

It is certified that error appears in the above-indentified patent and that said Letters Patent is hereby corrected as shown below:

On the title page, under "references Cited" and under the sub-heading "U.S. PATENT DOCUMENTS", insert the following references:

| | | |
|---|---|---|
| -- 319,515 | 6/1885 | Sellers |
| 1,745,891 | 2/1930 | Dimeo |
| 4,482,189 | 11/1984 | Samuelson et al |
| 4,492,264 | 1/1985 | Gaddi |
| 5,143,141 | 9/1992 | Frulla --; |

On the title page, under "References Cited" and under the sub-heading "FOREIGN PATENT DOCUMENTS", insert the following references:

| | | |
|---|---|---|
| --3400301 | 7/1985 | Germany |
| 0070812 | 1/1983 | EPO |
| 8103465 | 12/1981 | WIPO |
| 1526046 | 9/1978 | United Kingdom |
| 600,798 | 6/1960 | Canada |

UNITED STATES PATENT AND TRADEMARK OFFICE
CERTIFICATE OF CORRECTION

PATENT NO.   :   5,415,464
DATED        :   May 16, 1995
INVENTOR(S)  :   Roy Scott It is certified that error appears in the above-indentified patent and that said Letters Patent is hereby corrected as shown below:

| 2222160  | 10/1974 | France    |
| 61-3584  | 2/1986  | Japan   — |
| 1-178359 | 7/1989  | Japan     |
| 2-20652  | 1/1990  | Japan     |
| 2-41752  | 2/1990  | Japan --. |

Signed and Sealed this

Sixteenth Day of January, 1996

BRUCE LEHMAN

Attest:

*Attesting Officer*     *Commissioner of Patents and Trademarks*